(12) United States Patent
Milsom

(10) Patent No.: US 8,464,764 B1
(45) Date of Patent: Jun. 18, 2013

(54) FUEL SYSTEM ULLAGE FLOAT ASSEMBLY

(75) Inventor: Darren Milsom, Knoxville, TN (US)

(73) Assignee: Brunswick Corporation, Lake Forest, IL (US)

( * ) Notice: Subject to any disclaimer, the term of this patent is extended or adjusted under 35 U.S.C. 154(b) by 680 days.

(21) Appl. No.: 12/631,910

(22) Filed: Dec. 7, 2009

(51) Int. Cl.
*B65B 1/30* (2006.01)

(52) U.S. Cl.
USPC .......................... 141/198; 137/202; 220/86.2

(58) Field of Classification Search
USPC .................. 141/192, 198, 199, 303; 137/202, 137/429, 430, 433; 220/86.2
See application file for complete search history.

(56) References Cited

U.S. PATENT DOCUMENTS

| | | | |
|---|---|---|---|
| 4,646,772 A * | 3/1987 | Bergsma ........................ | 137/39 |
| 5,215,132 A | 6/1993 | Kobayashi | |
| 5,348,177 A * | 9/1994 | Sung ............................ | 220/86.2 |
| 5,568,828 A | 10/1996 | Harris | |
| 6,138,852 A | 10/2000 | Miura et al. | |
| 6,837,256 B2 | 1/2005 | Benjey | |
| 6,886,705 B2 | 5/2005 | Souma et al. | |
| 7,152,638 B2 | 12/2006 | Ganachaud | |
| 2009/0014090 A1* | 1/2009 | Roscher et al. ............... | 141/198 |

* cited by examiner

*Primary Examiner* — Jason K Niesz

(74) *Attorney, Agent, or Firm* — Malin, Haley DiMaggio & Bowen, P.A.

(57) ABSTRACT

A fuel system ullage float valve assembly is provided for fuel tank and fuel fill line. This assembly is located near the intersection of the fuel fill line entering the uppermost top section of a fuel tank. A ullage float valve assembly includes a cage enclosure having an upper collar, a plurality of leg members and a base, essentially forming a frame-like structure. The upper collar is partially inserted into, and nest within, the fuel fill line as it enters the tank. The leg members extend downwardly into the tank in a generally vertical position. The assembly also includes a buoyant float chamber, having a generally cylindrical base and a generally converging, conical upper section. The float chamber is buoyant and it housed within the cage enclosure, and is slididly movable within the enclosure. During the fueling process as fuel fills the tank the ullage float assembly rises within the cage enclosure and to reach a sealing engagement with the upper collar of the assembly causing termination of the fueling process. The float assembly also includes a fuel bypass port.

11 Claims, 8 Drawing Sheets

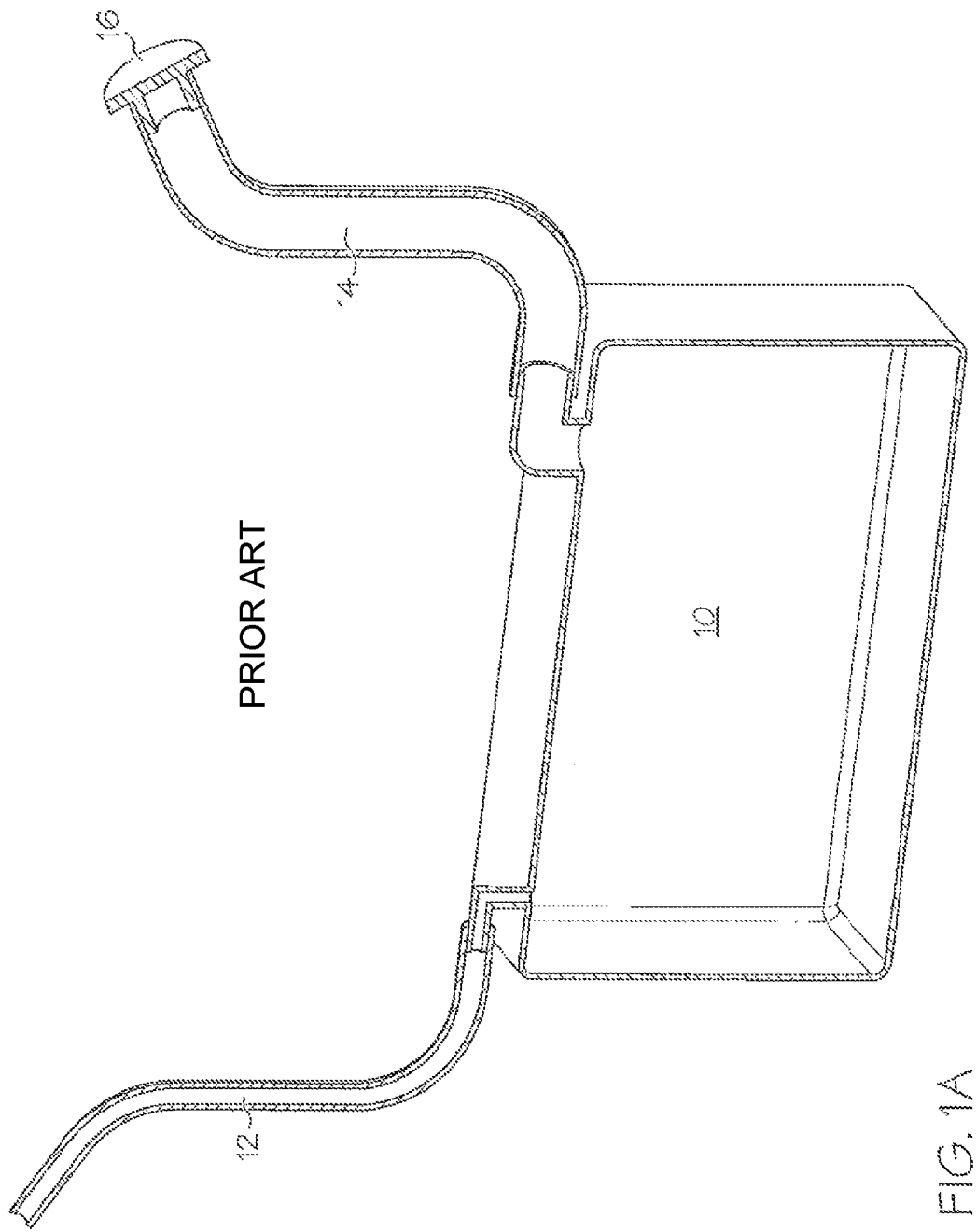

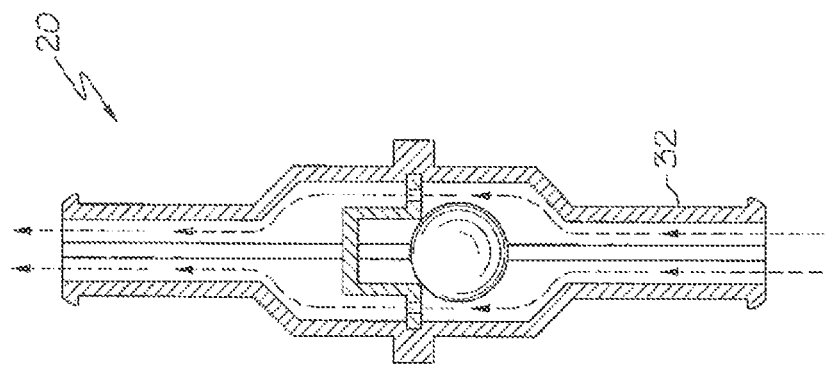
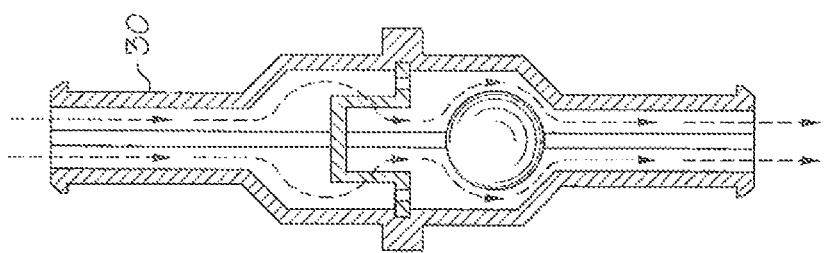
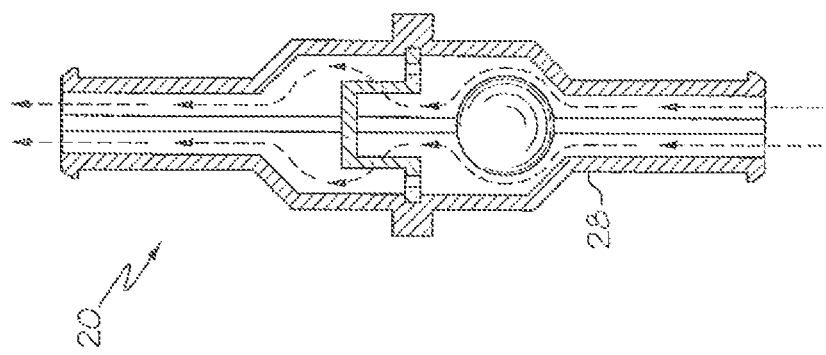
FIG. 1C, FIG. 1C', FIG. 1C''

FUEL SYSTEM ULLAGE FLOAT ASSEMBLY

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

This invention relates generally to fuel fill protective devices for fuel tanks, fuel fill lines and fuel vent lines, and more particularly to a marine fuel tank ullage valve. A novel ullage float valve assembly is disclosed which is secured to the fuel fill line at the point of entry into the top section of a marine fuel tank. Fuel tanks are subjected to diurnal temperature and pressure changes causing fuel to expand within the fuel tank, which in turn causes the deleterious effects of fuel expanding into the fuel tank ventilation line, or alternatively causing fuel to back up into the fuel fill line, and in either case fuel can be expelled from the system into the environment. The instant float valve assembly eliminates the need for accessory valves or protective canisters to be incorporated within the fuel vent lines, by providing a shut off mechanism during the fueling process, which simultaneously creates a ullage in the fuel tank thus preventing any liquid fuel from being forced into the ventilation lines during expansion.

2. Description of Related Art

Conventional marine fuel tank systems include the tank itself, the fuel fill line with a pressurized sealing fuel cap, and one or more fuel ventilation lines. The ventilation lines prevent pressure in the tank from exceeding regulations set by the federal government, as well as marine industry standards established by the American Boating and Yacht Council (ABYC). As the temperature rises, combustible fuel expands which creates a potentially dangerous rise in pressure within the fuel tank. The ventilation lines allow for fuel vapor to escape during the refueling process, thus preventing the fuel system from becoming over pressurized during fueling operations or because of thermal expansion. However, as fuel pumps, hoses and nozzles pump fuel at high volume per time increment, the fuel tank can reach capacity and yet the fueling operation continues which causes fuel to be pumped into the ventilation lines and/or back flow into the fuel fill line, both of which can be expelled into the vessel, the surrounding pump area, or the environment including the surrounding water.

Various attempts have been made to eliminate or mitigate the phenomenon of over filling fuel tanks, causing fuel to flow into the ventilation lines, creating back flow into the fuel fill line, and expelling gasoline into the environment.

U.S. Pat. No. 5,348,177 issued to Sung is entitled FUEL BACKWARD FLOW-PREVENTING DEVICE FOR USE IN AN AUTOMOTIVE VEHICLE, and discloses a custom designed fuel filler, fuel tank and a guide member which is connected to the inside nozzle of the main fuel fill line. The guide member includes a plurality of slits, and an inverted cone with legs members which travel through the slits. This device uses an air pocket within the inverted cone, and when the float member reaches the fuel fill line back pressure is created which shuts off the nozzle.

U.S. Pat. No. 6,138,852 issued to Miura et al. is entitled FUEL TANK, and discloses a check valve system which has a plurality of spray outlets on the head of the check valve. The check valve includes a housing having the plurality of openings, a valve member and spring biasing system to control movement. This system enters the side of the fuel tank, and is designed to cool down the fuel that is being stored within the tank body, thereby reducing the development of fuel vapor.

U.S. Pat. No. 6,837,256 issued to Benjey is entitled FILLER TUBE MOUNTED FUEL TANK REFUELING VALVE, and discloses a spring loaded poppet and spool valve assembly. A float operated latch is linked to the main valve body, and when the latch is released the spool valve is closed.

The prior art also contains additional designs incorporating a variety of nozzle receptors, breather-vent lines, conventional valves, spring valves and fuel filter/canister assemblies for fuel tanks and automobile systems, however none of this art addresses the specific solutions achieved by Applicant.

Currently marine gasoline fuel systems built for use in the United States are regulated by the Code of Federal Regulations, Title 33, as well as optional voluntary industry standards from the American Boating and Yacht Council, referred to as ABYC H-24.

Critical guidelines from these regulations pertain to the background art, including:

33 CFR §183.518
Each opening into the fuel tank must be at or above the topmost surface of the tank.

33 CFR §183.520
(a) Each fuel tank must have a vent system that prevents pressure in the tank from exceeding 90 percent of the pressure marked on the tank under §183.514(b)(5).
(b) Each vent must:
  (1) Have a flame arrester that can be cleaned unless the vent is itself a flame arrestor; and
  (2) Not allow a fuel overflow at the rate of up to two gallons per minute to enter the boat.

ABYC H-24
24.5.1 The installed fuel system shall be designed so that a fuel temperature rise of 60° F. (33° C.) shall not cause liquid fuel to spill into the boat or the environment when:
  24.5.1.1 the fuel tank is filled to its rated capacity according to the boat manufacturer's instructions, and
  24.5.1.2 the boat is in the static floating position.
NOTE: A fuel system designed to contain five percent fuel expansion is one method of meeting this requirement.
24.10.3 Tank connections, fittings and liquid level gauges and transmitters shall be readily accessible or accessible through an access panel, port or hatch.

Manufacturers typically comply with ABYC H-24.5.1 by recommending in their instruction manuals that owners limit filling the fuel tank to 95% of its maximum rated capacity. In conventional designs there are limited known alternatives to creating a "ullage", which is the amount by which the gasoline falls short of completely filling the fuel tank, and at the same time complying with CFR §183.518 cited above with respect to openings in the top most surface of the fuel tank.

The cited 5% ullage in the tank is required so that as fuel expands due to diurnal temperature changes, the fuel does not expand into the ventilation line, or alternatively the fuel cannot be expelled out of the fuel system and into the vessel or the environment.

A movement has begun in the marine industry to establish further standards and requirements which address diurnal fuel emissions, and will result in mandatory standards requiring boat manufactures to design and install diurnal emission controls on new vessels.

In conventional practice, there are currently two primary options used by manufactures to comply with the EPA diurnal emissions control regulations. The first involves the installation of a carbon filled canister within the ventilation line in order to trap hydrocarbons that are contained in the ventilated air. The ventilated air is expelled out of the ventilation line through the diurnal temperature changes which cause the gasoline to expand and contract. The second involves the installation of pressure relief valve system which encapsulates the fuel emissions by sealing the tank until the pressure exceeds a predetermined value, such as one psi.

There is nothing presently known in conventional practice or in the background art which takes into account the phenomenon described above, acts as a fuel system ullage float valve of precision design and operation, and functions at maximum efficiency in preventing undesired back flow or flow through the ventilation lines or any included valve or canister assemblies. Therefore, there exists a need for a fuel system ullage float valve assembly which accounts for diurnal temperature and pressure changes and fuel expansion, and prevents the deleterious effects described above.

BRIEF SUMMARY OF THE INVENTION

It is therefore an object of the present invention to provide a marine fuel tank ullage valve that prevents or limits the spilling of fuel during fueling operations.

It is another object of this invention to prevent fuel from entering the fuel tank ventilation lines, or alternatively preventing the back-flow of fuel through the fuel fill line.

It is a further object of this invention to provide a marine fuel tank ullage valve which is a precision device creating a ullage in the tank as desired, and simultaneously terminating the flow of fuel to the fuel tank.

It is an additional object of the instant invention to provide a marine fuel tank ullage valve which is cost effective and operationally efficient.

Finally, it is an object of the invention to provide a marine fuel tank ullage valve having all the above features and characteristics.

These and other objects are accomplished by the present invention which comprises a fuel system ullage float valve assembly for a fuel tank and fact fill line. The float valve is located in the area where the fuel fill line enters the uppermost top section of the fuel tank, and enters the tank itself.

The assembly includes a cage enclosure which acts as a frame member for a float chamber, and includes and upper collar, leg members which protrudes into the fuel tank and terminating flanges or a base which completes the cage enclosure.

The legs of the cage further include inwardly or internally facing tracks, channels or protruding rib-like members.

The neck or collar is designed to fit into the fuel fill line, and the collar is beveled or angled at its base to accommodate the shape of the float chamber. The cage enclosure houses the float chamber itself, which rises within the cage as fuel fills the tank. When the float chamber reaches its highest point it rests against the uppermost section of the cage enclosure, against the collar, creating a back pressure in the fuel fill line and stopping the flow of fuel from the pump nozzle.

The float chamber is movable within the cage enclosure, and slides upwardly or downwardly therein. The float chamber includes external ribs or similar protrusions which slide within the tracks or channels of the leg members. Alternatively, the design can be reversed, in which the tracks are on the float chamber itself, and the leg members include protruding ribs or the like.

The float chamber also includes one or more fuel bypass ports, in order to accommodate fuel seepage from the fuel line into the tank once the fuel flow has been terminated. The fuel bypass ports can be recessed troughs or channels within the float chamber itself, or alternatively can incorporate an internal duct or enclosed flow channel through the float chamber.

In a primary embodiment a flow chamber has a cylindrical base section, and a converging upper conical section. In a primary design, the slope of the upper conical section is complementary in shape to the beveled or angled section at the lowermost point of the collar.

In accordance with the above descriptions, these and other objects will become apparent hereinafter, the instant inventions will be described with particular reference to the accompanying drawings.

BRIEF DESCRIPTION OF THE DRAWINGS

FIG. 1A is a cross sectional perspective view of a conventional fuel system.

FIG. 1C is a cross sectional view of a conventional surge protector.

With reference to FIG. 1A, a cross sectional view of a conventional fuel system is illustrated. The system includes fuel tank 10, fuel fill line 14, and fuel vent line 12. Typically such a system includes a non-pressure sealing fuel cap 16.

FIG. 1B is a cross sectional perspective view of conventional technology which is EPA compliant, and includes typical carbon filled canisters 18 and fuel surge protectors 20. A typical system may include one or more of these devices. Also as shown, given the federal regulations and those of the marine manufacturers industry, the fuel fill line 14 enters the fuel tank at its uppermost surface 22. During filling operations, fuel enters the tank at inlet 24 and vapor exits the tank at vapor outlet 26.

A critical aspect of the carbon filled canister 18 to function properly as a diurnal emission control device is that the liquid gasoline cannot be allowed to enter the canister. Should this occur, the carbon and chemical composition will become saturated to the point that the canister fails to trap the hydrocarbons and therefore ceases to function in its essential role as an emissions control device.

An equally important aspect of the pressure relief system is that it must comply with the regulations stating that the "installed fuel system shall be designed such that a temperature rise of 60 F (33 C) shall not cause liquid fuel to spill into the boat or the environment."

For both of the emission control options set forth above, it is therefore imperative that the ullage is created by physical means and not by operator instructions which are prone to error.

Figure 1B:
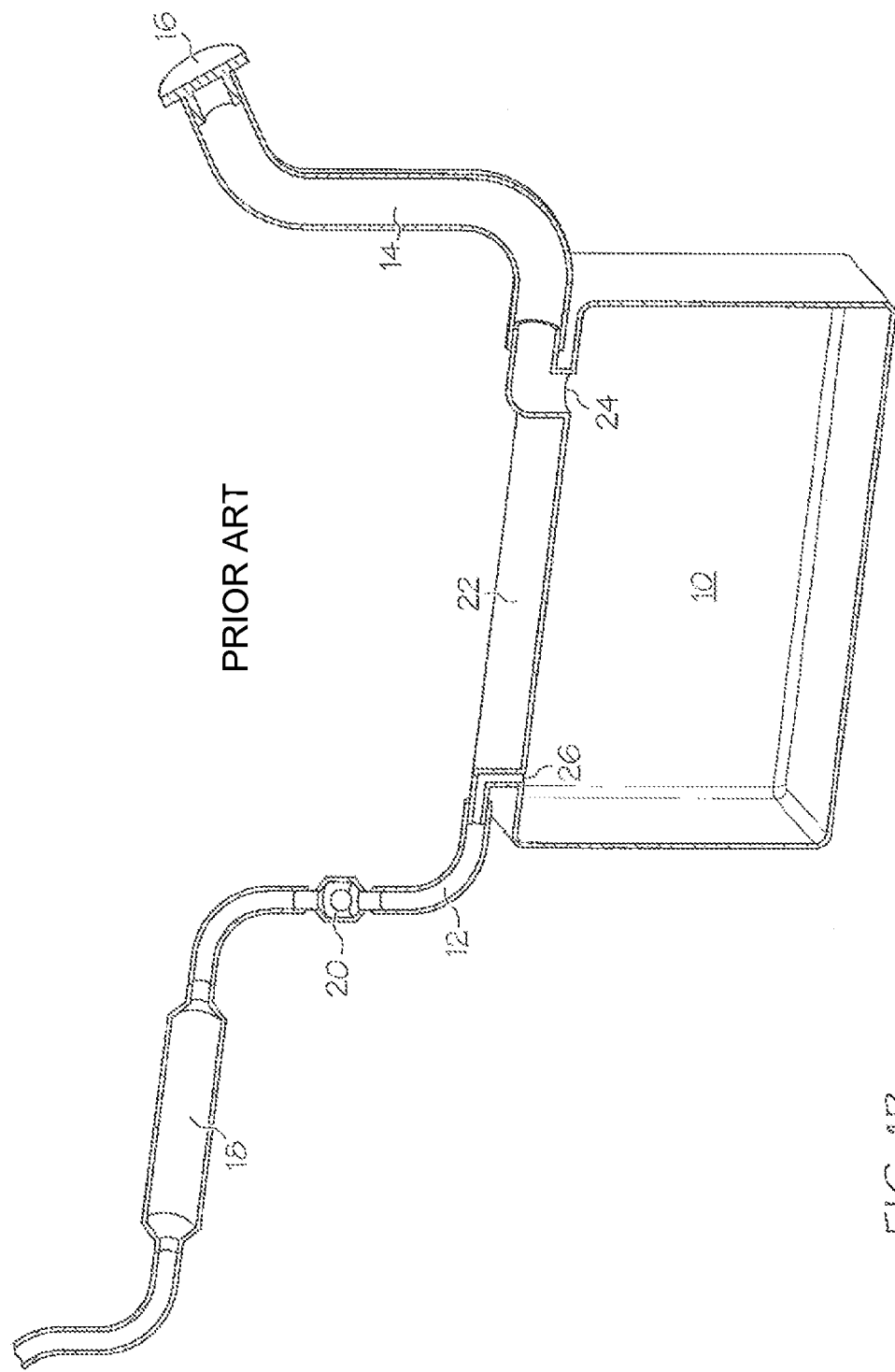
FIG. 1B is a cross sectional perspective view of conventional technology incorporating canister and fuel surge protector devices.

FIG. 1C depicts a cross sectional plan view of a fuel surge protector 20. This current technology is designed to stop gasoline from entering the carbon filled canisters within the ventilation line as illustrated in FIG. 1B. In configuration 28, the surge protection valve is in a venting mode, in configuration 30 the surge protection valve in an air induction mode, and in configuration 32 the device is in its actual surge protection mode.

The fuel surge protection valve is placed vertically between the fuel tank and the carbon filled canister and its operation works by a float mechanism.

As gasoline flows up the vent line the float ball rises and then partially seals the vent line.

This fuel surge protector is designed to stop a gasoline surge and not to completely stop gasoline from bypassing as this could lead to pressurization of the fuel system, which violates CFR regulation §183.520. With this device it is possible to fill the boat's fuel tank to capacity, then as the temperature of the gasoline rises and the gasoline therefore expands, liquid gasoline could be forced into the carbon filled canister or out through the fuel surge protection valve. This could lead to liquid gasoline entering the carbon canister.

Figure 2:
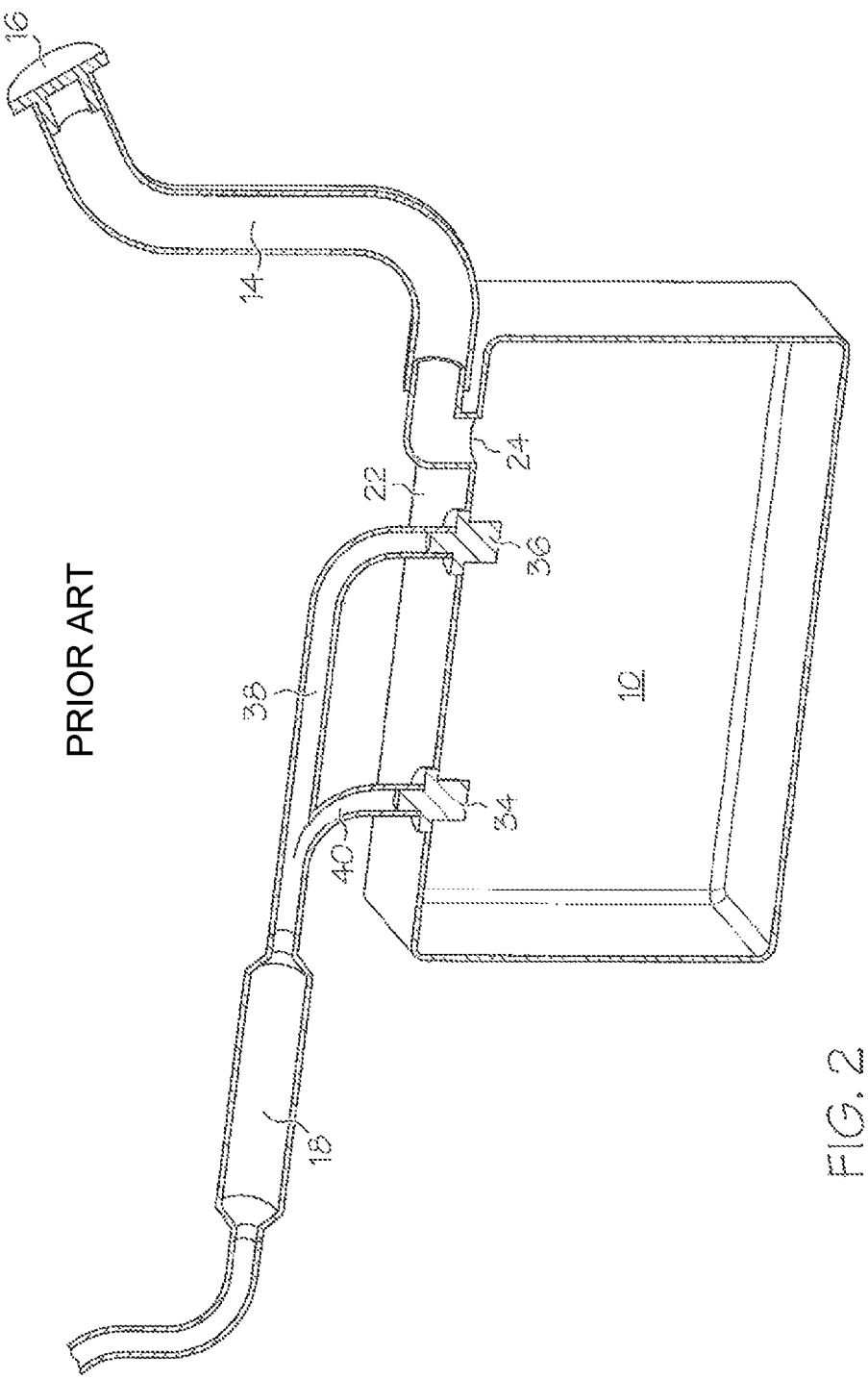
FIG. 2 is a cross sectional perspective view of EPA approved conventional fuel systems which incorporate alternative valve protection devices.

FIG. 2 illustrates an alternative approved technology designed to prevent gasoline from entering the carbon filled canister 18, in which a ullage in the tank is created through a system similar to that implemented in the automotive industry. This system operates by having multiple valves located within the ventilation lines which, due to their location and design, will prevent pressure in the tank from exceeding 80% of the maximum pressure for which the tank is designed, pursuant to the manufacturing specifications. Multiple valves, such as grade rollover valve 34 and fill limit vent valve 36 are incorporated into multiple vent lines 38 and 40.

Although the system illustrated in FIG. 2 is functional and will meet minimum requirement standards, there are significant design and cost limitations for use in a marine fuel system which are substantial deterrents for manufacturers. The federal regulations, as referenced above, require that all fittings, liquid level gauges, transmitters and the like must be readily accessible or accessible through an access panel, port or hatch for purposes of maintenance and operation. There are significant costs in terms of design, production and equipment in complying with such a system, including those relating to the additional valves required, the additional vent and pipe lines, assembly and maintenance.

The fuel system as illustrated in FIG. 1B contains inherent flaws, as the system is limited by design to stopping a surge fuel from entering the carbon filled canister. It does not create a ullage in the tank that is utilized to comply with the federal requirements of accommodating a thermal expansion of the fuel. There is also the possibility that the fuel surge protectors could become clogged and inoperable causing the fuel system to be pressurized, which in turn causes several dangers and does not comply with other regulations cited above.

Similarly, the conventional technology illustrated in FIG. 2 is problematic. Although the system will create a compliant ullage within the tank, in order for this carbon canister and pressure relief system to function properly there are significant design and cost limitations for use in the marine fuel system. These include additional valves and piping, additional access panels, ports and/or hatches, as well as overcoming design limitations due to the position of the additional valves in outlet ports in the top section of the tank.

Figure 3:
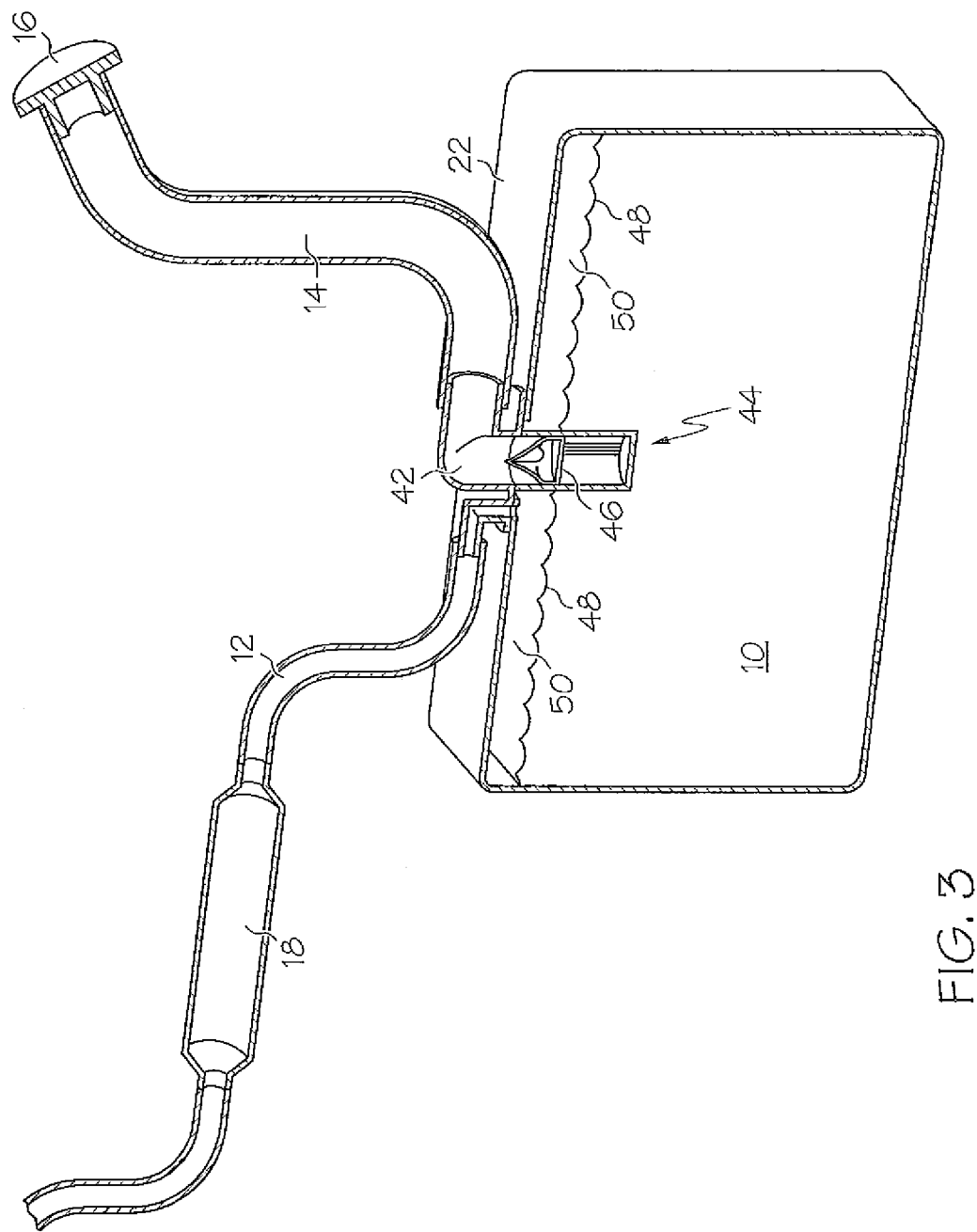
FIG. 3 is a cross sectional perspective view of a fuel system incorporating the ullage float valve assembly of the instant invention.

FIG. 3 illustrates a cross sectional perspective view of the novel ullage float valve assembly of the instant invention. Applicant's design creates a ullage in the fuel tank which greatly reduces or eliminates the possibility of liquid fuel from entering the ventilation line and has virtually little or no risk of pressurizing the fuel system. This system illuminates complexities of conventional technology, and results in a substantial cost and maintenance savings.

The fuel fill pipe 42 enters the fuel tank 10 at its top section 22. the float valve assembly includes cage enclosure 44 and float chamber 46. As shown in FIG. 3, float chamber 46 has reached its uppermost position within cage enclosure 44. Fuel surface line 48 indicates the height of the fuel within the tank, and the ullage 50 which is created when the float valve assembly operates to create a back pressure and shut off the fuel fill nozzle and fuel pump.

Figure 4:
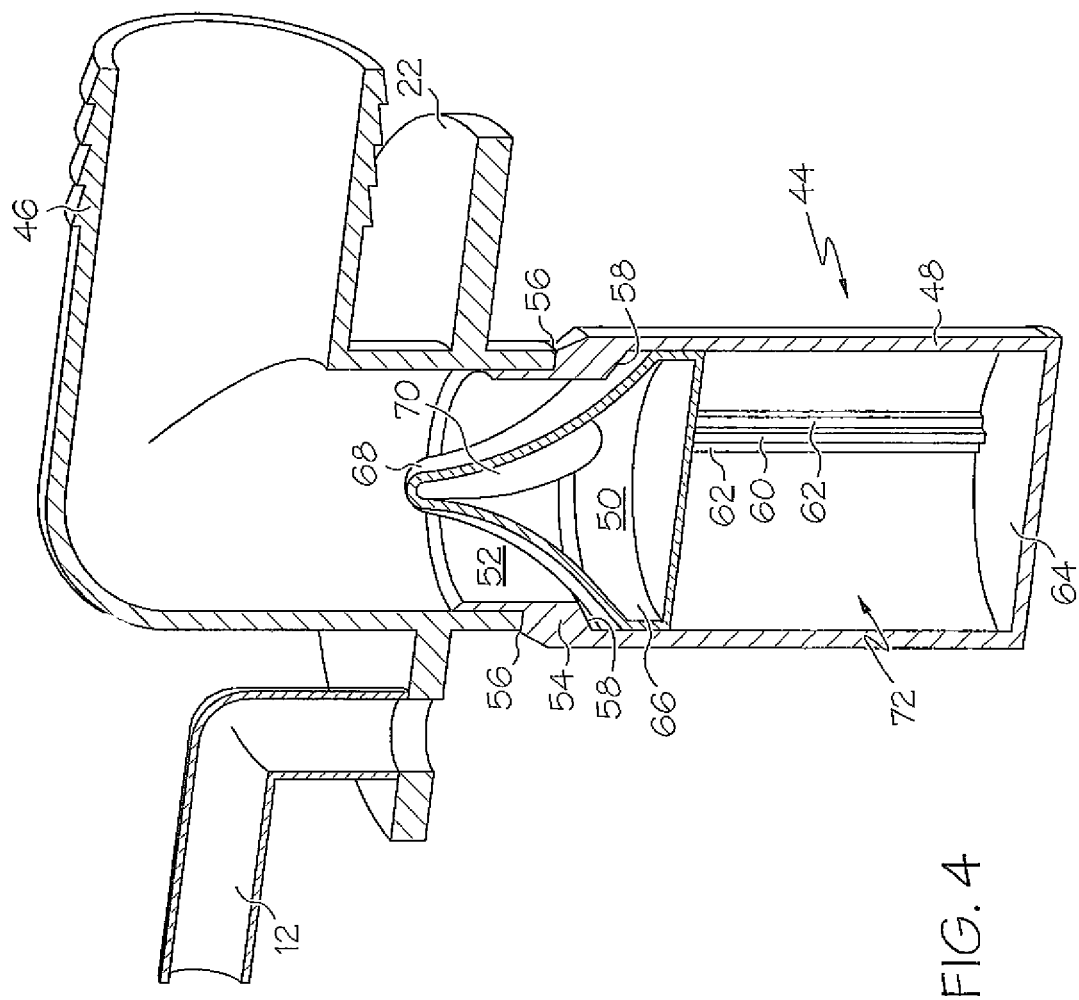
FIG. 4 is an enlarged cross sectional perspective view of the ullage float valve assembly of the instant invention.

With reference to FIG. 4, this represents an enlarged cross sectional perspective view illustrating the novel ullage float valve assembly 44. Fuel inlet conduit 46 is shown entering top surface 22 of the fuel tank. Ventilation is accomplished through fuel vent line 12 as discussed above. The float valve assembly includes cage enclosure 48 which provides the framework for housing float chamber 50. The cage enclosure includes the upper collar 52 which is inserted to the fuel conduit 46, partially protruding and nesting therein. The collar includes an external flange 54 which abuts the fuel conduit 46 at termination points 56 when the collar 52 is inserted to its uppermost point within the fuel conduit.

In a particular embodiment, upper collar 52 is generally cylindrical to be geometrically compatible with the fuel conduit. However, as would be understood to one skilled in the art, other geometrical shapes can be utilized for both fuel pipes and cage enclosure collars, such as being square, rectangular or the like.

The external flange 54 at its uppermost surface abuts the fuel fill line conduit, defining the placement and position of the cage enclosure within the fuel tank.

In a particular embodiment, upper collar flange 54 includes angled lower internal edges 58 to accommodate, and geometrically complement, the float assembly described hereinafter.

The cage enclosure includes a plurality of downwardly extending leg members 60, one or more of which incorporate internally facing channel tracks 62. By internally facing, Applicant intends on inwardly facing toward the center of the cage enclosure such that they interact with the float chamber, also described hereinafter.

Cage enclosure further includes base 64, although alternative designs may incorporate flange members secured at the distal ends of leg members 60.

Float chamber 50, in a particular embodiment, includes a lower, generally cylindrical base section 66, an upper converging conical section 68, and fuel bypass port 70.

In a preferred embodiment, fuel bypass port 70 is a recessed trough or groove formed on the external service of the upper conical section 68. In an alternative embodiment, fuel bypass port 70 can be an internal duct or channel located near the top of the conical section and terminating at a point below collar 52, such that fuel present in the fuel flow line seeps through the fuel bypass port beneath the cage enclosure collar and seal points of the float assembly and into the fuel tank. During the fueling process, fuel is expelled into the tank through cage enclosure openings 72. As appreciated to one skilled in the art, the cage enclosure constitutes a frame-like unit, in which the leg members are relatively thin and beam-like, in comparison to the larger open area ports 72 which allow for the primary fuel flow into the tank during fueling operations.

In the configuration illustrated in FIG. 4, the float chamber 50 has reached its uppermost position within cage enclosure 44, such that it is resting against the lowermost section of collar or neck 52. This would represent the maximum fill level in the tank, and once the flow chamber would reach this position, it creates the referenced back pressure within the fuel line, thereby deactivating the gas pump nozzle. In this position, the sloped sides of the upper conical section 68 rest against the angled lower surfaces 58 of the collar 52 and collar flange 54.

In this embodiment, the lower cylindrical section 66 of the float chamber has a diameter which exceeds the diameter of the upper collar 52, thereby further accommodating a sealing engagement when the float chamber abuts the collar and flange section.

The float chamber also incorporates external protruding ribs about its base, such that the float chamber travels within the cage enclosure, and the protruding ribs move in a sliding manner within the channels on the inside of leg members 60. Of course, as will be apparent to a skilled artisan, the interacting and complementary designs can be switched; the leg members on their inside surface could incorporate protruding ribs or similar structure, and the external surface of the float chamber base area could define grooves or tracks, also allowing for the float chamber to move up and down within the cage assembly. The leg members, track and rib structure are generally vertically positioned, as is the entire valve assembly within the fuel tank.

Figure 5:
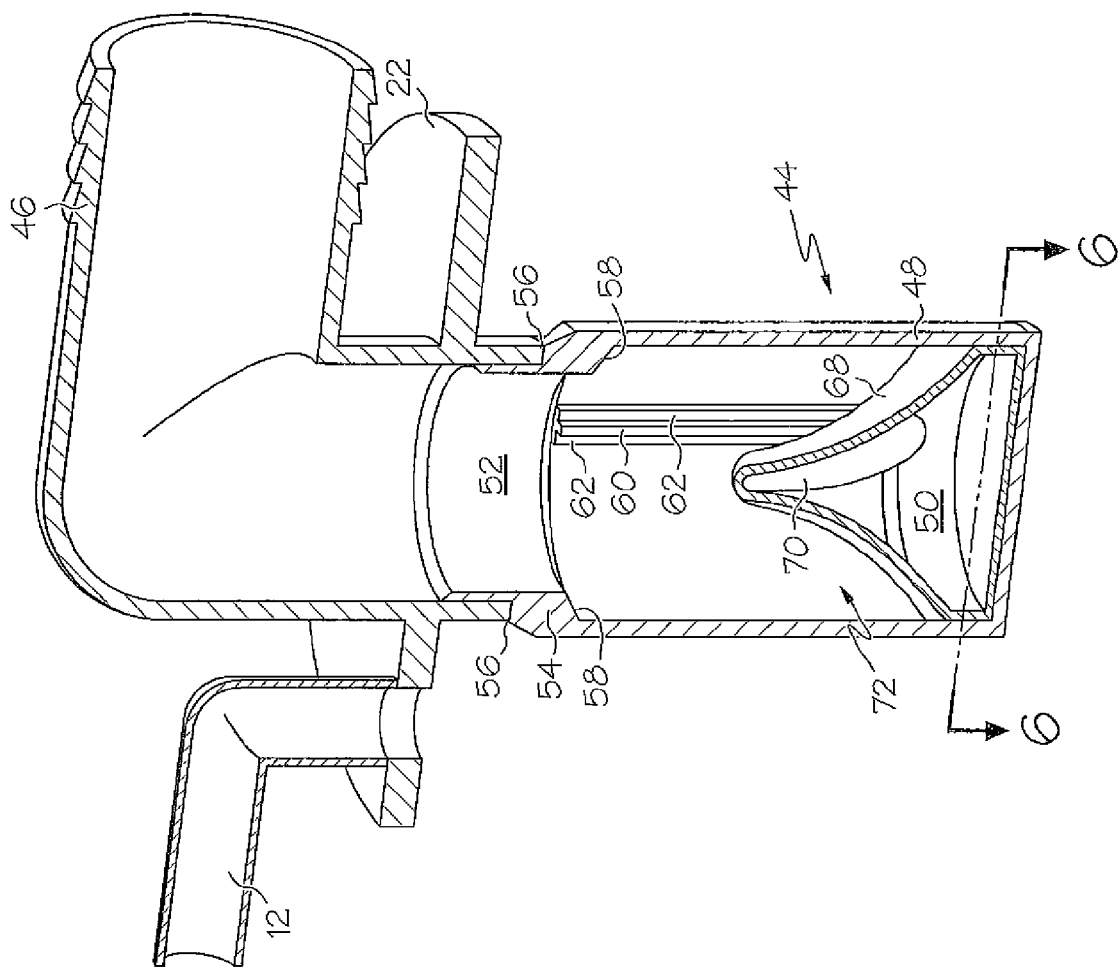
FIG. 5 is an alternative enlarged cross sectional perspective view of the ullage float valve assembly of the instant invention.

With reference to FIG. 5, the float chamber 68 is shown in its lowermost position within the cage enclosure. At this stage, fuel in the tank would be below the base 64 or lowermost end of the cage enclosure. Once the fuel level reaches the float chamber 50, as the chamber is essentially closed and buoyant, it begins to rise towards the top of the tank within the assembly housing and framework provided by the cage enclosure. Prior to the fuel reaching the float chamber, the fuel exits the fuel line and enters the tank through the spacious openings 72 of the cage enclosure.

Also as illustrated in FIGS. 4 and 5, the leg members of the cage enclosure are shown as being offset from the upper collar 52 and external flange 54, which accommodates the size of the float chamber at its largest diameter. In alternative embodiments, the offset of the leg members can be eliminated as a matter of design choice.

The instant designs and float valve assemblies create a ullage in the fuel tank which greatly reduces or eliminates the possibility of liquid fuel from entering the ventilation line and any related carbon filled canister. Applicant's system does not place any accessory components or valves in the ventilation line, in the fuel tank itself, or otherwise, and therefore eliminates the risk of unduly pressurizing the fuel system.

Because of the ullage created in the tank, when diurnal temperatures act upon the liquid fuel creating expansion, the gap present in the tank above the fuel allows for the expansion without any fuel entering the vent lines or back fueling the fill line. During the refueling process, the float chamber is forced down to the lowermost point of the cage enclosure. As the tank becomes relatively full, fuel within the tank forces the float chamber upwardly to the top section of the cage enclosure through the buoyancy of the float chamber. Once the float chamber reaches its uppermost point, in sealing and abutting engagement with the cage collar and/or flange, this sealing engagement causes a back pressure to be created within the fuel fill line which terminates the nozzle and pump. This partial sealing of the fuel fill line causing liquid fuel to fill the line until it reaches the fill nozzle, at which time the conventional automatic shut-off in the fuel nozzle activates to stop pumping any more fuel into the tank. Once the operator removes the fuel nozzle the excess fuel within the fuel fill line then seeps back into the tank through the bypass port in the float chamber, the bypass port acting as a fuel seepage passageway.

Figure 6:
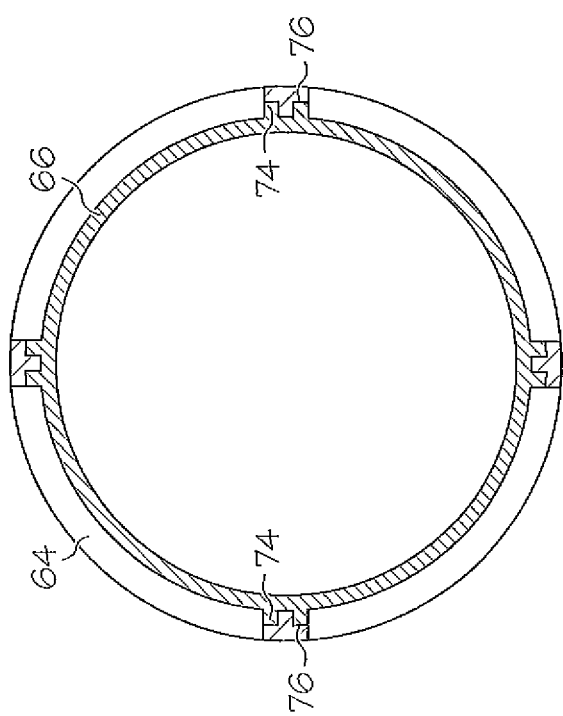
FIG. 6 is a cross sectional view taken along line 6-6 of FIG. 5.

FIG. 6 represents a cross sectional cut away top view of the cage enclosure, depicting base 66 of the float chamber resting within the cage enclosure about its base 64. The float chamber external protruding ribs 74 interlock with channel tracks 76 of the cage enclosure leg members.

The instant invention has been shown and described herein in what is considered to be the most practical and preferred embodiment. It is recognized, however, that departures may be made therefrom within the scope of the invention and that obvious modifications will occur to a person skilled in the art.

The invention claimed is:

1. A fuel system ullage float valve assembly for a fuel tank and fuel fill line, located in proximity to the intersection of the fuel fill line entering the top section of a fuel tank, comprising:
   a cage enclosure, said cage enclosure including an upper collar, a plurality of leg members, and a base member;
   said upper collar for nesting engagement within said fuel fill line, said upper collar partially protruding into, and being secured within, said fuel fill line; said upper collar further including an external flange, said external flange abutting said fuel fill line and limiting the insertion of said upper collar into said fuel fill line;
   said plurality of leg members extending downwardly from said upper collar and into said fuel tank;
   said base member being secured to said leg members;
   a float chamber, said float chamber having a generally cylindrical base section and a converging generally conical upper section; said upper collar flange further including a lower angled internal edge for receiving and complementing said conical upper section;
   said float chamber being buoyant and housed within said cage enclosure, and moveable therein; and
   wherein, during a fueling process as fuel fills said fuel tank reaching said ullage float assembly, said float chamber rises within said cage enclosure to reach sealing engagement with said upper collar causing termination of said fueling process.

2. The apparatus of claim 1 wherein said plurality of leg members extend downwardly from said external flange of said upper collar;
   said plurality of leg members further defining internally facing channel tracks;
   said generally cylindrical base section of said float chamber further defining a plurality of generally vertical external ribs;
   said leg member channel tracks guiding said external ribs for sliding engagement as said float chamber moves within said cage enclosure.

3. The apparatus of claim 1 wherein said float chamber cylindrical base has a diameter which exceeds the internal diameter of said upper collar;
   said lower angled internal edge of said upper collar flange abutting and providing sealing engagement with said conical upper section of said float chamber when said float chamber rises to its uppermost position within said cage enclosure.

4. The apparatus of claim 1 wherein said float chamber further defines a fuel bypass port providing fuel seepage from said fuel line into said fuel tank when said float chamber is in sealing engagement with said upper collar.

5. The apparatus of claim 4 wherein said fuel bypass port is an external trough defined on the external surface of said float chamber.

6. The apparatus of claim 4 wherein said fuel bypass port is an internal duct defined within said float chamber.

7. A fuel system ullage float valve assembly for a fuel tank and fuel fill line, located in proximity to the intersection of a fuel fill line entering the top section of a fuel tank, comprising:
- a cage enclosure, said cage enclosure including an upper collar, and a plurality of leg members;
- said upper collar being in fluid communication with said fuel fill line, said plurality of leg members extending downwardly from said upper collar and into said fuel tank;
- a float chamber, said float chamber constituting a closed chamber;
- said float chamber being buoyant and housed within said cage enclosure, and moveable therein; and said float chamber further defining a fuel bypass port providing fuel seepage from said fuel line into said fuel tank when said float chamber is in sealing engagement with said upper collar; and
- wherein, during a fueling process as fuel fills said fuel tank reaching said ullage float assembly, said float chamber rises within said cage enclosure to reach sealing engagement with said upper collar causing termination of said fueling process.

8. The apparatus of claim 7 wherein said plurality of legs further define channel tracks;
- said float chamber further comprises a plurality of external ribs;
- said leg member channel tracks guiding said external ribs for sliding engagement as said float chamber moves within said cage enclosure.

9. The apparatus of claim 7 wherein said fuel bypass port is an external trough defined on the external surface of said float chamber.

10. The apparatus of claim 7 wherein said fuel bypass port is an internal duct defined within said float chamber.

11. A fuel system ullage float valve assembly for a fuel tank and fuel fill line, located in proximity to the intersection of a fuel fill line entering the top section of a fuel tank, comprising:
- a cage enclosure, said cage enclosure including an upper collar, and a plurality of leg members;
- said upper collar being in fluid communication with said fuel fill line, said plurality of leg members extending downwardly from said upper collar and into said fuel tank;
- said plurality of leg members further having a plurality of channel tracks;
- a float chamber, said float chamber constituting a closed chamber;
- said float chamber being buoyant and housed within said cage enclosure, and moveable therein;
- said float chamber further having a plurality of external ribs;
- said leg member channel tracks guiding said external ribs for sliding engagement as said float chamber moves within said cage enclosure;
- said float chamber further defining a fuel bypass port providing fuel seepage from said fuel line into said fuel tank when said float chamber is in sealing engagement with said upper collar;

wherein, during a fueling process as fuel fills said fuel tank reaching said ullage float assembly, said float chamber rises within said cage enclosure to reach sealing engagement with said upper collar causing termination of said fueling process.

* * * * *